(12) United States Patent
Lagrange

(10) Patent No.: US 9,410,056 B2
(45) Date of Patent: Aug. 9, 2016

(54) FLAME RETARDANT COATING

(71) Applicant: Tony Lagrange, Edmonton (CA)

(72) Inventor: Tony Lagrange, Edmonton (CA)

( * ) Notice: Subject to any disclaimer, the term of this patent is extended or adjusted under 35 U.S.C. 154(b) by 0 days.

(21) Appl. No.: 14/089,619

(22) Filed: Nov. 25, 2013

(65) Prior Publication Data

US 2014/0163167 A1    Jun. 12, 2014

Related U.S. Application Data

(63) Continuation of application No. 12/239,642, filed on Sep. 26, 2008, now abandoned.

(51) Int. Cl.
| | |
|---|---|
| C08G 18/67 | (2006.01) |
| C08K 5/00 | (2006.01) |
| C08F 2/44 | (2006.01) |
| C09D 175/02 | (2006.01) |
| C08G 18/32 | (2006.01) |
| C08G 18/79 | (2006.01) |
| C09D 5/18 | (2006.01) |
| C09D 7/12 | (2006.01) |
| C09K 21/12 | (2006.01) |
| C08K 3/00 | (2006.01) |
| C08K 3/04 | (2006.01) |

(52) U.S. Cl.
CPC .......... *C09D 175/02* (2013.01); *C08G 18/3215* (2013.01); *C08G 18/792* (2013.01); *C09D 5/18* (2013.01); *C09D 7/1216* (2013.01); *C09K 21/12* (2013.01); *C08K 3/0058* (2013.01); *C08K 3/04* (2013.01); *C08K 5/0066* (2013.01)

(58) Field of Classification Search
CPC ...... C09D 175/02; C09D 5/18; C09D 7/1216; C08G 18/3215; C08G 18/792; C08K 3/0058; C08K 3/04; C08K 5/0066; C09K 21/12
USPC ...................................... 427/427.6
See application file for complete search history.

(56) References Cited

U.S. PATENT DOCUMENTS

| 5,710,108 A | 1/1998 | McNally | |
|---|---|---|---|
| 2004/0110870 A1 | 6/2004 | Liu | |
| 2006/0099034 A1* | 5/2006 | Sengupta et al. | 405/150.1 |
| 2011/0313084 A1* | 12/2011 | Furar et al. | 524/101 |

FOREIGN PATENT DOCUMENTS

WO    2009143001    11/2009

OTHER PUBLICATIONS

Evonik Industries: Tego Airex 900 Application Recommendation; Technical Data Sheet; Apr. 2014, believed to be available before, or believed to be similar in content to another document available before, the priority date.
Evonik Industries: Tego Airex 900; Safety Data Sheet; Aug. 2003.
Albemarle: Ethacure 100 Curative; Product Information Sheet; 2011, believed to be available before, or believed to be similar in content to another document available before, the priority date.
The Hanson Group: HXI 1624 Isocyanate; Technical Data Sheet, 2008.
The Hanson Group: HXI 1644; Technical Data Sheet; Feb. 2008.
Chemical Book: Octadecanamide, N,N-1,2-ethanediylbis12-hydroxy-, mixt. with hydrogenated castor oil; Product Properties Page;     <<http://www.chemicalbook.com/ProductChemical-PropertiesCB61214273_EN.htm>>; 2008, or , believed to be available before, or believed to be similar in content to another document available before, the priority date.
Momentive: Silquest A-187; Technical Data Sheet; 2015, believed to be available before, or believed to be similar in content to another document available before, the priority date.
Expandable Graphite, Asbury Carbons, accessed Jun. 2015 but believed to be available before, or believed to be similar in content to another document available before, the priority date.

* cited by examiner

*Primary Examiner* — Susannah Chung
*Assistant Examiner* — Robert T Butcher
(74) *Attorney, Agent, or Firm* — Frank J. Dykas; Dykas Law Offices, PLLC

(57) ABSTRACT

A flame retardant coating is disclosed. The flame retardant coating comprises polyurea elastomer, spray processable graphite, a graphite stabilizer agent, and a flame retardant. A method of manufacturing a flame retardant polyurea elastomer coating is also disclosed. A two part polymerizable system is provided comprising a first part containing isocyanates, and a second part containing polyamines. At least one of the first part and the second part contains a flame retardant, and both of spray processable graphite and a graphite stabilizer agent. The first part and the second part are then mixed to form the flame retardant polyurea elastomer coating.

7 Claims, 3 Drawing Sheets

```
                    ┌─────────────────────────────────────────────────────────┐
                    │     Providing a two part polymerizable system comprising a first    │
                    │  part containing isocyanates, and a second part containing polyamines, │
                    │   in which at least one of the first part and the second part contains a │
                    │  flame retardant, and both of spray processable graphite and a graphite │
                    │                         stabilizer agent.                │
                    └─────────────────────────────────────────────────────────┘
                        14        16
                                    ↓
                    ┌─────────────────────────────────────────────────────────┐
                    │    Mixing the first part and the second part to form the flame │
                    │              retardant polyurea elastomer coating.       │
                    └─────────────────────────────────────────────────────────┘
```

Fig. 3

```
         18
          ┌─────────────────────────────────────────────────────────┐
          │        Providing a first part containing isocyanates, and a second part │
          │  containing polyamines, in which at least one of the first part and the second │
          │  part contains a flame retardant, a mineral matrix agent, and both of spray │
          │            processable graphite and a graphite stabilizer agent.    │
          └─────────────────────────────────────────────────────────┘
              20
                            ↓
          ┌─────────────────────────────────────────────────────────┐
          │   Mixing the first part and the second part to form the flame retardant │
          │          polyurea elastomer coating on the smooth surface.  │
          └─────────────────────────────────────────────────────────┘
```

Providing a two part polymerizable system comprising a first part containing isocyanates, and a second part containing polyamines, in which at least one of the first part and the second part contains both of spray processable graphite and thixatrol asa graphite suspending agent.

24

Mixing the first part and the second part to form the flame retardant polyurea elastomer coating.

Fig. 5

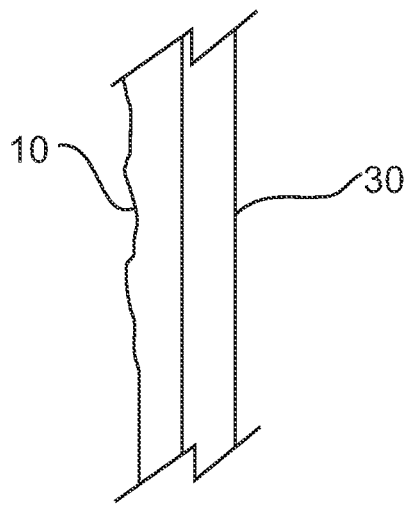

Fig. 6

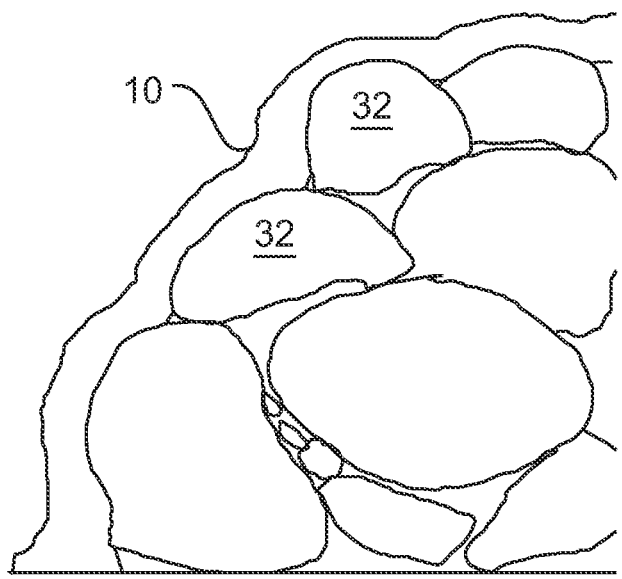

Fig. 7

FLAME RETARDANT COATING

CROSS-REFERENCE TO RELATED APPLICATIONS

This application claims the benefit under 35 USC 120 of U.S. non-provisional application Ser. No. 12/239,642 filed Sep. 26, 2008.

TECHNICAL FIELD

This document relates to flame retardant coatings, and flame retardant polyurea elastomer coatings.

BACKGROUND

An intumescent is a substance which swells as a result of heat exposure, thus increasing in volume, and decreasing in density. Intumescents are typically used in passive fire protection and, in America, require listing and approval use and compliance in their installed configurations in order to comply with the law.

SUMMARY

A flame retardant coating is disclosed. The flame retardant coating comprises polyurea elastomer, spray processable graphite, a graphite stabilizer agent, and a flame retardant.

A method of manufacturing a flame retardant polyurea elastomer coating is also disclosed. A two part polymerizable system is provided comprising a first part containing isocyanates, and a second part containing polyamines. At least one of the first part and the second part contains a flame retardant, and both of spray processable graphite and a graphite stabilizer agent. The first part and the second part are then mixed to form the flame retardant polyurea elastomer coating.

A method of adhering a flame retardant polyurea elastomer coating to a smooth surface is also disclosed. A first part and a second part are provided, the first part containing isocyanates, and the second part containing polyamines. At least one of the first part and the second part contains a flame retardant, a mineral matrix agent, and both of spray processable expandable graphite and a graphite stabilizer agent. The first part and the second part are mixed to form the flame retardant polyurea elastomer coating on the smooth surface.

A method of manufacturing a flame retardant polyurea elastomer coating is also disclosed. A two part polymerizable system is disclosed comprising a first part containing isocyanates, and a second part containing polyamines. At least one of the first part and the second part contains both of spray processable graphite and a graphite suspending agent. The first part and the second part are mixed to form the flame retardant polyurea elastomer coating.

Disclosed are polyurea elastomers with built-in intumescence. In some embodiments, the polyurea elastomer have no polyurethane present.

A flame retardant composition is also disclosed comprising polymer matrix comprising at least one of polyurethane and polyurea, spray processable graphite, a graphite stabilizer agent, and a flame retardant. In some embodiments, the polymer matrix further comprises polyurethane.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 3 is a flow schematic of a method of manufacturing a flame retardant polyurea elastomer coating.

FIG. 4 is a flow schematic of a method of adhering a flame retardant polyurea elastomer coating to a smooth surface.

FIG. 5 is a further method of manufacturing a flame retardant polyurea elastomer coating comprising a graphite suspending agent.

FIG. 6 is a side elevation view, in section, of a flame retardant polyurea elastomer coating on structural steel.

FIG. 7 is a side elevation view, in section, of a flame retardant polyurea elastomer coating over rocks.

DETAILED DESCRIPTION

Immaterial modifications may be made to the embodiments described here without departing from what is covered by the claims.

Polyureas are commonly used as, for example, secondary containment liners because of their seamless application and rapid cure. The flammability of existing polyurea secondary containment linings may actually contribute to the intensity of a fire, and thus intumescents may be added to improve flame resistance.

In some embodiments, a coating is provided that has the surface hardness, flexibility, and chemical resistance of a sprayed polyurea. Tear strength may be slightly lower than regular polyureas. The coating may have the longevity of a polyurea as well as low flammability. Unlike many existing secondary containment liners, the intumescent polyurea do not require covering with sand for fire protection. This feature minimizes disposal issues due to contaminated sand from spills.

In some embodiments, a coating is provided that is a fire resistant, zero VOC, high performance polyurea elastomer. This coating may be designed to provide a flame resistant, durable, chemical resistant lining for secondary containment applications and as a surface coating for metal, concrete or wood for example. In some embodiments, the coating is a fast set system which allows a fast return to service. It may be intended for use with plural component spray equipment with a mix ratio of 1 to 1, for example.

Figure 1:
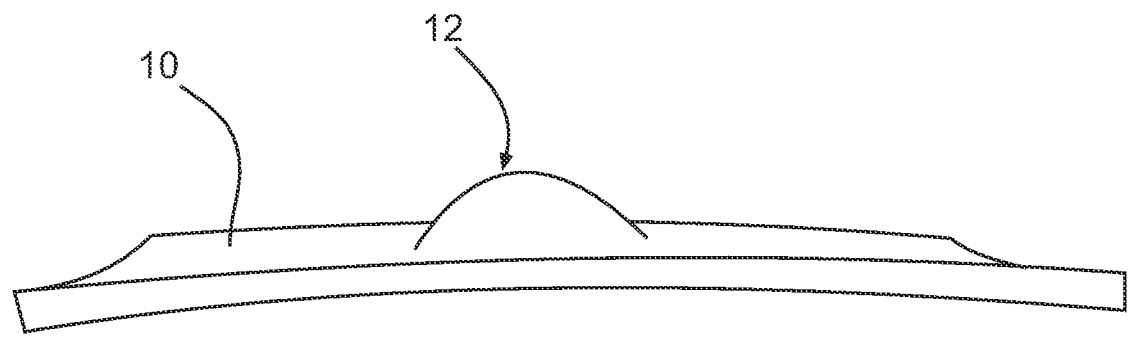
FIG. 1 is a perspective view of a flame retardant polyurea elastomer coating.

Referring to FIG. 1, a flame retardant coating 10, for example a flame retardant polyurea elastomer coating is illustrated. Coating 10 comprises polyurea elastomer, spray processable graphite, a graphite stabilizer agent, and a flame retardant. As illustrated coating 10 is flame retardant, and intumesces under flame heat, for example forming an expanded portion 12.

Spraying coating 10 may require on-site machine processing. Spray processable graphite refers to the fact that the graphite is suitable to be processed in the type of machinery used to apply polymer formulations, for example a high pressure proportioner or a reaction injection molding machine. In order to achieve suitable intumescent expansion of the sprayed expandable graphite, a large enough particle size is required, but if the particle size is too large then it will not be spray processable in a machine. On the other hand, if too small of a size is used, the graphite won't expand enough or provide enough fire protection. Because larger graphite particle sizes give better fire retardant performance, previous systems employed the use of larger graphite particles. However, systems with larger graphite particles can't process through RIM or HP proportioners, and had to be mixed by hand or in a static mixer, which have reduced productivity relative to a spray device. Thus, a sprayable system that provides good fire retardant properties was needed.

In some embodiments, a blend of graphite small enough to machine process, but also large enough to give a more stable char is used. The combination of two or more types of graphite may improve the performance. In some embodiments, the spray processable graphite is 50-110 mesh, with at least 50% of the spray processable graphite being between 50 and 70 mesh. In other embodiments, the spray processable graphite is 100% 60 mesh. For reference, 50 mesh corresponds to a size of about 300 microns, while 100 mesh corresponds to a particle size of about 150 microns. Graphite is not typically used in elastomers because it causes problems and doesn't process well. In some embodiments, this document teaches a modified form of graphite that will avoid these problems. In general, the use of suitable densities of machine spray processable graphite produces a coating 10 that passes at least the flame spread test.

The graphite stabilizer agent is employed to form a polymer char that locks the graphite together under flame heat. The presence of the graphite stabilizer agent insulates the graphite as it expands, gluing the graphite together and forming a skin that limits the amount of oxygen that can access the graphite. Graphite, on its own, may form a porous material that falls off under turbulent flame conditions. The graphite stabilizer agent may comprise for example at least one of ammonium polyphosphate, zinc polyborate, melamine polyphosphate, melamine pyrophosphate, triethyl phosphate, and zinc phosphate.

The coating 10 is designed to pass Federal US regulations for the ASTM E 1354 Test Method for Heat and Visible Smoke Release Rate, the ASTM E162 Test Method for Surface Flammability, and the ASTM E662 Test Method for Specific Optical Density of Smoke Generated by Solid Materials. An example of a suitable flame retardant is TCPP (tris (chloroisopropyl) phosphate). In some embodiments the flame retardant comprises no brominated compounds, as these are known carcinogens. In some embodiments, coating 10 may be provided with or without halogenated flame retardants, depending on the application. In general, halogenated flame retardants may be used where high performance is required, although good performance may still be obtained using a halogen-free composition.

In some embodiments, coating 10 may further comprise a graphite suspending agent. Because the graphite comprises particulates, the graphite may settle out of the liquid formulation used to create coating 10. The suspending agent suspends the graphite, allowing the coating 10 formed by spraying and reacting the formulation to have graphite suitably uniformly dispersed throughout the coating 10. This gives the coating 10 better flame retardant characteristics. This may also be important during processing of the formulation used to create coating 10, since any settled graphite may clog the spray machinery. The graphite suspending agent is to be contrasted with standard thickeners, or viscosity modifiers, in that it physically suspends the graphite beyond merely reducing the rate of drop out. Some thickeners, such as hydroxyethyl cellulose, have been found to be not effective at suspending the graphite. In some embodiments, the graphite suspending agent comprises THIXATROL ST™.

In some embodiments, the polymeric composition further comprises a mineral matrix agent. The mineral matrix agent greatly aids the performance of coating 10 when affixed to smooth surfaces, for example steel or metal. Under the intense heat of a flame, the mineral matrix agent leaves a mineral matrix that prolongs the life of the char that is formed. The mineral matrix formed prevents the pyrolysis of the carbon char, the pyrolysis of which may otherwise result in the char being blown off of the surface it is affixed to, leaving bare surface to be incinerated. This is important in steel applications, as the longer the char is maintained, the longer it takes for the surface of the material coating 10 is affixed to reach its critical temperature. In some embodiments, the mineral matrix agent comprises at least one of glass and perlite. The glass may be provided as small spheres, or as processed shards for example. Referring to FIG. 6, in some embodiments, coating 10 may be used as fire protection for structural steel 30.

Referring to FIG. 7, in some embodiments, coating 10 may be used as a rock reinforcing coating in, for example, an underground mine. In the example shown, coating 10 is covering a pile of rocks 32. In other of these embodiments, coating 10 may be sprayed on the walls, roof, or floor of the interior of a mine, in order to reinforce it. Coating 10 forms a gas impermeable stop that prevents hazardous gases from leaching from the formation and into the mine shaft.

In some embodiments, coating 10 is formed by a two-part polymerizable system. In the case of polyurea elastomers, one component typically contains isocyantes, while the other component contains polyamines. The mixing of these two components causes the reaction that forms the coating 10.

Referring to FIG. 3, a method of manufacturing a flame retardant polyurea elastomer coating is illustrated. In a step 14, a two part polymerizable system comprising a first part containing isocyanates, and a second part containing polyamines, is provided. At least one of the first part and the second part contains a flame retardant, and both of spray processable graphite and a graphite stabilizer agent. In a second step 16, the first part and the second part are mixed to form the flame retardant polyurea elastomer coating 10.

Referring to FIG. 4, a method of preparing a flame retardant polyurea elastomer coating on a smooth surface is illustrated. In a step 18, a first part containing isocyanates, and a second part containing polyamines, is provided. At least one of the first part and the second part contains a flame retardant, a mineral matrix agent, and both of spray processable graphite and a graphite stabilizer agent. In a step 20, the first part and the second part are mixed to form the flame retardant polyurea elastomer coating 10 on the smooth surface. The smooth surface may comprise, for example, metal. The smooth surface may comprise, for example, phenolic composite panels (not shown).

Referring to FIG. 5, a method of manufacturing a flame retardant polyurea elastomer coating is illustrated. In step 22, a two part polymerizable system comprising a first part containing isocyanates, and a second part containing polyamines, is provided. At least one of the first part and the second part contains both of spray processable graphite and a graphite suspending agent. In step 24, the first part and the second part are mixed to form the flame retardant polyurea elastomer coating 10.

Figure 2:
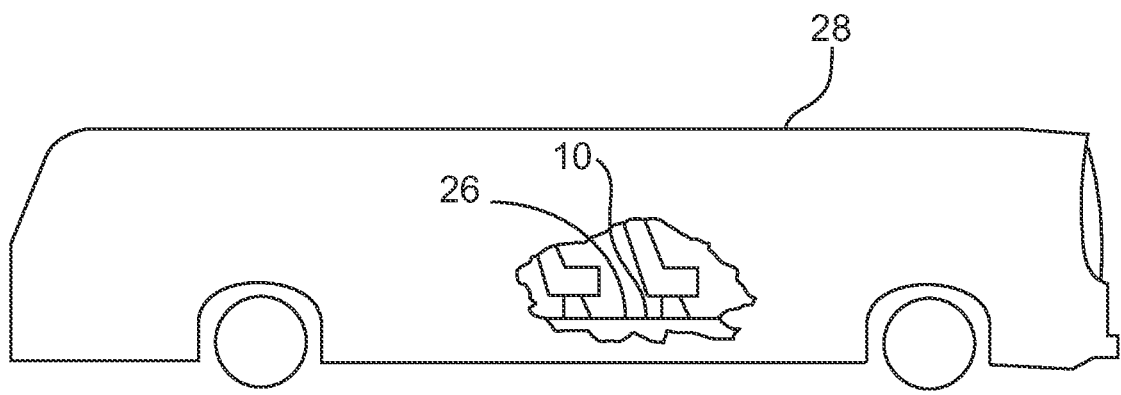
FIG. 2 is a side elevation view of a transport vehicle, with a partial cut-away illustrating the interior of the vehicle.

Referring to FIG. 2, the coating 10 may be used as flooring 26 in a transport vehicle 28. The coating 10 may be a spray applied polymer that cures rapidly to form a seamless, durable floor finish. This spray may be available in a range of solid colors or with optional accent colors for a designer finish. As a spray-in-place floor system it offers the design flexibility of color variations. Options include guided walkways to ensure optimum traffic flow, borders or outlines, safety markings and custom logos permanently imbedded in the floor. Flooring 26 is the only spray-in-place floor system that exceeds all federal fire safety standards for use in mass transit applications. Flooring 26 may be used in passenger railcar, bus and other transit vehicles, for example, as well as station and other floor areas. One advantage with using the disclosed flooring 26 is an improvement in productivity brought about by the ability to spray apply the system. Previous flooring systems in railcars and buses required that a rubber surface had to be glued down using contact cement. This type of procedure, including drying and installation time, could take at least 8 days to complete. This can be contrasted with the installation of flooring 26, which may be achieved in a single day, allowing the vehicle to be back online in at most two days. In some embodiments, flooring 26 may be any type of flooring. Flooring 26 is highly abrasion resistant, long lasting and has superior impact resistance. Because it is an elastomer, flooring 26 has no cracking or chipping. Flooring 26 remains flexible at low temperatures and gives excellent traction in cold weather. Flooring 26 is also stain resistant, which reduces cleaning time. In order to avoid graphite streaking, the two-component system may be adjusted to change the speed with which it is cured, allowing the graphite to settle below the surface of coating 10 before curing.

Table 1 below illustrates an exemplary two part polymerizable system. As is evident, there are numerous optional components that may be present, such as moisture scavengers, defoamers, thixotropic agents, solvents, coupling agents, and a variety of other species that may improve or tailor the resulting coating 10. In addition, various coloring agents may be used, such as for example Black Paste, Red Oxide, and Yellow Oxide. In the exemplary system, two different types of polymeric isocyanates are used, in order to carefully control the hardness of the resulting coating.

TABLE 1 exemplary two part polymerizable system

| ingredients | lbs | Kg | L | Function | % by Weight | Range (%) |
|---|---|---|---|---|---|---|
| COMPONENT A | | | | | | |
| Polypropylene diamine | 53.21 | 24.14 | 24.21 | Reactive amine | 36.5 | 25-50 |
| Zeolite Paste | 4.55 | 2.06 | 1.79 | moisture scavenger-optional | 3.1 | 0-5 |
| THIXATROL ST ™ | 0.13 | 0.06 | 0.06 | suspending agent | 0.09 | 0-0.2 |
| AIREX 900 ™ | 0.09 | 0.04 | 0.04 | defoamer | 0.06 | <1 |
| Fumed Silica | 0.10 | 0.05 | 0.02 | thixotropic agent | 0.08 | 0.05-0.10 |
| Ammonium Polyphosphate | 30.40 | 13.79 | 7.26 | Forms polymer char | 20.8 | 0-30 |
| AIREX 900 ™ | 0.03 | 0.01 | 0.01 | Defoamer | 0.02 | <1 |
| Diethyltoluene diamine | 24.50 | 11.11 | 10.87 | Reactive amine | 16.8 | 0-25 |
| SILQUEST A-187 ™ | 0.48 | 0.22 | 0.20 | coupling agent to adhere to surface | 0.3 | 0-1 |
| graphite 3626 ™ (75% >75 μm, 20% <180 μm) | 23.65 | 10.73 | 5.364 | expander | 16.2 | 0-30 |
| graphite 3538 ™ (70% <75 μm) | 8.69 | 3.94 | 1.970 | expander | 6 | 0-30 |
| sub total | 145.82 | 66.14 | 51.80 | | 100 | |
| COMPONENT B | | | | | | |
| TCPP | 32.92 | 14.93 | 11.58 | flame retardant | 24.8 | 0-40 |
| HXI 1624 ™ | 50.00 | 22.68 | 19.89 | polymeric isocyanate | 37.6 | 0-100 |
| HXI 1644 ™ | 50.00 | 22.68 | 19.89 | combo harder or softer | 37.6 | 0-100 |
| sub total | 132.92 | 60.29 | 51.36 | | 100 | |
| TOTAL | 278.74 | 126.44 | 103.16 | | | |

TABLE 2

Further exemplary two part polymerizable system

| ingredients | lbs | Kg | L |
|---|---|---|---|
| COMPONENT A | | | |
| D-2000 ™ | 1359.17 | 616.51 | 618.37 |
| Zeolite Paste | 116.22 | 52.72 | 45.63 |
| THIXATROL ST ™ | 3.19 | 1.45 | 1.42 |
| AIREX 900 ™ | 2.30 | 1.04 | 1.10 |
| R-972 ™ | 2.55 | 1.16 | 0.53 |
| APP | 776.55 | 352.24 | 185.39 |
| Tio2 | 0.00 | 0.00 | 0.00 |
| RAVEN 410 ™ | | | |
| Red Oxide | | | |
| Yellow Oxide | | | |
| AIREX 900 ™ | 0.64 | 0.29 | 0.30 |
| ETHACURE 100 ™ | 625.78 | 283.85 | 277.74 |
| SILQUEST A-187 ™ | 12.26 | 5.56 | 5.20 |
| graphite 3626 ™ | 604.07 | 274.00 | 130.478 |
| graphite 3538 ™ | 221.86 | 100.63 | 47.921 |
| sub total | 3724.59 | 1689.46 | 1314.08 |
| COMPONENT B | | | |
| TCPP | 840.84 | 381.40 | 295.66 |
| HXI 1624 ™ | 1277.10 | 579.29 | 522.35 |
| HXI 1644 ™ | 1277.10 | 579.29 | 514.01 |
| sub total | 3395.04 | 1539.98 | 1332.02 |
| TOTAL | 7119.63 | 3229.44 | 2646.10 |

In Table 2, a further exemplary system is illustrated. This table is not necessarily indicative of every species present in each component. Further, the amounts of pigment have not been indicated, as these will vary depending on the desired color. This system has been used to create the flooring in the trains of the BART transport system in San Francisco. In order to create component A (also known as the resin), a clean resin blend tank is placed on a platform scale, and D-2000™ (polyamine-polyoxypropylenediamine) and the Zeolite paste are added. Next, the tank is placed under a mixer and blended at high speed. While mixing, the THIXATROL ST™ (hydrogenated castor oil and Octadecanamide,N,N'-1,2-ethanediyl-bis 12-hydroxy-), AIREX 900™ (organo-modified polysiloxane containing fumed silica or dichlorodimethylsilane reaction products with silica), R-972™ (fumed silica), APP (Ammonium polyphosphate), $TiO_2$, RAVEN 410™ (carbon black/black paste), Red Oxide, and Yellow Oxide are added. Ethacure may be used (curing agent, % 75-81—3,5-diethyl-toluene-2,4-diamine, % 18-20—3,5-diethyltoluene-2,6-diamine, % 0.5-3—Dialkylated m-phenylenediamines, %<0.08 Water). The mixture is then blended for 60 minutes, and the temperature is raised to 31 degrees Celsius. The blender is then slowed to medium speed, and AIREX 900™), SILQUEST A-187™ (Gamma-Glycidoxypropyltrimethoxysilane) and graphite are added. At first only the 3538 Graphite is added slowly and ground over 10 minutes. Then, the 3626 Graphite is added slowly and ground over another 5 minutes. The entire mixture is then blended at medium speed for 15 minutes. A sample is then collected and submitted for quality control, and upon approval, the mixture is filled into storage drums.

In order to create component B (also called the Iso), a clean ISO blend tank is placed on a scale. DOP, if present, is removed from the tank, and HXI 1644™, HXI 1624™, and TCPP are added. The tank is then placed under a mixer and blended for 45 minutes. A sample is then collected and submitted for quality control, and upon approval, the mixture is filled into storage drums. DOP (dioctyl phthalate) is put into the tank before storage. A single batch size used to create a coating 10 with these components may comprise 1323 liters of component A, and 1332 liters of component B. Table 3 illustrates some E162 test results with exemplary coatings.

For application, a regulated high-pressure proportioner (1:1) and spray gun system capable of producing 2000-2500 psi may be used. Component A may be thoroughly mixed for 45 to 60 minutes prior to use. Component A may also be preheated to achieve a uniform mix. It should be checked that no residue is left on the bottom of drum after mixing. Recommended Heat Settings include: Line/Pre-Heaters 150-160 F, Hose Heat 150-160 F. The components are then applied to a properly prepared substrate. A first coat is applied at less than 10 mm and allowed to become tack free before continuing. Following coats are then applied at 20 mm per coat, allowing the surface to become tack free before the application of subsequent coats. The coating is sprayed with a uniform motion, allowing 50 to 75% overlap.

TABLE 3

E162 Flame Spread Data

| COMPANY: | Quantum Group | VTEC# | 100-2992-4 |
|---|---|---|---|
| COLOR: | Grey | AL FOIL? | YES |
| DIMENSIONS: | 6" x 18" | EXP TIME: | 15 MIN. |
| THICKNESS: | 0.229" | DATE: | 7/11/2008 |
| SPECIAL PREPARATION: | none | | |
| OBSERVATIONS: | | | |

| | Time To | | | | |
|---|---|---|---|---|---|
| Specimen | 3 inches (min) | 6 inches (min) | 9 inches (min) | 12 inches (min) | 15 inches (min) |
| 1 | 1.35 | 9.33 | 12.18 | — | — |
| 2 | 2.18 | 7.25 | 12.08 | — | — |
| 3 | 1.58 | 7.93 | 9.5 | — | — |
| 4 | 2.25 | 8.67 | 12.93 | — | — |

| Specimen | Fs | Q | Sample Wt kg | Base Temp deg C. | Max Temp deg C. | Is INDEX |
|---|---|---|---|---|---|---|
| 1 | 2.11 | 11.75 | 1.881 | 192.8 | 255.1 | 24.8 |
| 2 | 1.86 | 10.31 | 1.888 | 196.5 | 251.2 | 19.2 |
| 3 | 2.14 | 12.65 | 1.898 | 189 | 256.1 | 27.03 |
| 4 | 1.82 | 10.64 | 1.882 | 194 | 250.4 | 19.35 |
| Average | 1.9825 | 11.3375 | 1.88725 | 193.075 | 253.2 | 22.595 |

AVG. FLAMESPREAD FACTOR (FS) = 1.98
AVERAGE HEAT OF EVOLUTION (Q) = 11.34
AVERAGE FLAMESPREAD INDEX (Is) = 22.6
FLAMESPREAD INDEX RANGE (Is) = 19.2 TO 27.03

Table 4 illustrates some physical properties of an exemplary coating used as flooring material in the BART system. The exemplary finished spray flooring coating material with a thickness of 60 to 125 mil (1500 to 3000 micron) meets the requirements listed in Table 4.

TABLE 4

Physical properties of exemplary coating used as flooring material

| Tensile Elongation, ASTM D412: | 100% |
|---|---|
| Tensile Strength, ASTM D412: | 600-1000 psi |
| Shore D Hardness, ASTM A2240: | 45-50 before texture is applied, with texture, hardness shall be 30 minimum |
| Gel Time/Tack Free: | 3 to 10 seconds |
| Solids by Volume: | 100% |
| Abrasion Resistance, ASTM D4060: | 250 mg. wt. loss/cycles |

The exemplary flooring has been manufactured to meet the following test requirements for fire, smoke, toxicity, and friction. In the Standard Test Method for Critical Radiant Flux of Floor Covering Systems Using a Radiant Heat Energy Source (Method: ASTM E-648), the requirement was that the flooring have a Critical Radial Flux of more than or equal to 0.50 watts/sq. cm. In the Standard Method for Specific Optical Density of Smoke Generated by Solid Materials (Method: ASTM E-662), the requirements in the flaming and non-flaming modes were: Ds @ 1.5 minutes-maximum: 100, DS @ 4.0 minutes-maximum: 200, Dm @ 15.0 minutes-maximum: 300, and Dm @ 20.0 minutes-maximum: 300. In the Cone calorimeter tests, three tests were required at each of the following: 25, 50, and 75 kW/sq meter using horizontal sample position (Method: ASTM E-1354). The requirements were a maximum heat release rate of less than 150 kW/sq meter, an average heat release rate at 3 minutes of less than 100 kW/sq meter, and an average heat release ignition to flameout of less than 50 kW/sq meter. In the toxicity tests, (Bombardier test method SMP800 or Boeing test method BSS-7238 "Test Method for Smoke Generation by Materials in Combustion"), the requirements were that the generation of toxic gases identified below do not exceed the indicated concentration in either the flaming or non-flaming modes: Carbon Monoxide (CO): 3500 ppm, Nitrogen Oxides ($NO_2$): 100 ppm, Sulphur Dioxide ($SO_2$): 100 ppm, Hydrogen Chloride (HCL): 500 ppm, Hydrogen Fluoride (HF): 200 ppm, and Hydrogen Cyanide (HCN): 150 ppm. In the slip Resistance tests (Method: ASTM C-1028), the requirements were that the Coefficient of friction for both wet and dry conditions is 0.6 or greater. In the Adhesion, Bonding tests, which illustrate the bonding strength of the spray coating to the fiberglass and steel substrate of the floor Method: ASTM D-4541), the requirement was that the Pull-off strength, using a 20 mm (0.79 inches) diameter plug, must be 500 psi or greater.

Disclosed is a novel fire resistant polymer coating 10. This can be spray and injection moulded or spray applied to a wide range of substrates. The rapid cure rate of this coating allows a fast return to service in retrofit applications and rapid deployment in OEM applications. This coating may be used where all the benefits of durability and performance are needed, and where life safety is paramount, such as marine applications, passenger rail and mass transit. Some physical properties may include a Flame Spread Classification (ASTM E84) of 20, a Smoke Developed Classification (ASTM E84) of 115, a Service Temperature of −50 to 200 C, a Shore Hardness of 50D approximately, an Elongation of 100%, and a Tensile Strength of 1000 psi.

In some embodiments, the polyurea elastomer may have no polyurethane present. This may be accomplished, for example, by providing component A with no polyols. In some embodiments, in order to achieve the desired targets for flammability and smoke densities, polyurethane must be avoided. Polyurethane is thermoplastic, and thus it may soften too much and fall away under the intense heat of flame, failing fire tests.

In some embodiments, a coating is provided that is a fire resistant, polyaspartic polyurea coating. This coating may be designed to provide a flame resistant, UV resistant finish coat for application to metal, concrete or wood for example. Table 5 illustrates an exemplary preparation for a coating 10 of this nature.

TABLE 5

Exemplary polyaspartic coating

| Ingredients | lbs | Kg | L | % by weight | Range (%) |
|---|---|---|---|---|---|
| COMPONENT A | | | | | |
| Desmophen 1420 | 985.13 | 446.85 | 421.56 | 41.7 | 0-50 |
| Desmophen XP 7076 | 146.93 | 66.65 | 76.61 | 6.2 | 10-Feb |
| Acematt TS100 | 0 | 0 | 0 | | 0-5 |
| Byk 333 | 4.31 | 1.95 | 1.88 | 0.2 | <1 |
| Additive OF | 26.72 | 12.12 | 13.46 | 1.1 | 0.5-2 |
| Propylene Carbonate | 0 | 0 | 0 | | 0-20 |
| TCPP | 0 | 0 | 0 | | 0-25 |
| Borchi Gol 0011 | 30.39 | 13.78 | 16.03 | 1.3 | 2-Jan |
| Eversorb 74 | 41.74 | 18.93 | 16.18 | 1.8 | 0-5 |
| Tio2 | 46.72 | 21.19 | 5.3 | 2 | Varies |
| Raven 410 | 1.44 | 0.65 | 0.36 | 0.1 | Varies |
| Red Oxide | 2.61 | 1.18 | 0.26 | 0.1 | Varies |
| Yellow Oxide | 7.31 | 3.32 | 0.72 | 0.3 | Varies |
| APP | 396.73 | 179.96 | 94.71 | 16.8 | 0-30 |
| graphite 3626 | 316.6 | 143.61 | 71.805 | 13.4 | 0-25 |
| graphite 3538 | 105.58 | 47.89 | 23.945 | 4.5 | 0-25 |
| Eversorb 93 | 0 | 0 | 0 | | |
| Desmophen 1520 | 250.46 | 113.61 | 107.18 | 10.6 | 0-50 |
| sub total | 2362.67 | 1071.7 | 850 | 100 | |
| COMPONENT B | | | | | |
| TEP | 523.62 | 237.51 | 221.97 | 32.2 | 0-50 |
| MEK | 0 | 0 | 0 | 0 | 0-10 |
| Desmodur N-3600 | 1102.01 | 499.87 | 430.92 | 67.8 | 50-80 |
| Xylene | 0 | 0 | 0 | 0 | 0-10 |
| sub total | 1625.63 | 737.38 | 652.9 | 100 | |

The polyaspartic polyurea uses an aliphatic isocyanate rather than for example an aromatic isocyanate, in order to impart different characteristics to the resulting coating, such as UV resistance. Uv resistance makes the coating 10 more resistant to degradation by the sun. The desmodur N-3600 is an HDI, which may be contrasted with the MDIs used in other coating 10 embodiments. In some embodiments, a combination of MDI and HDI may be used.

There are numerous examples of applications for the coatings 10 disclosed herein. Examples include, but are not limited to, roofing, siding, insulation, wall covering, structural element coating, exterior covering for buildings or vehicles, floorways, walkways, and reinforcing covering.

A flame retardant polymer composition is also disclosed comprising polymer matrix, spray processable graphite, a graphite stabilizer agent, and a flame retardant. The polymer matrix may comprise at least one of polyurethane and polyurea. In some embodiments, the polymer matrix comprises polyurethane. It should be understood that the polymer composition may have all of the same characteristics, and be made in similar ways as, any of the coating 10 embodiments disclosed herein. A skilled worker would understand that all of the methods disclosed herein may be adapted to create these polymer compositions, by substituting at least one of the polyamines and isocyanates in the preparations. For example, a two part polymerizable system may be produced that will yield a polyurethane coating if polyols are used in component A. Similar to coating 10, the flame retardant polymer composition may further comprise THIXATROL ST™ as a graphite suspending agent. In some embodiments, the flame retardant polymer composition is a coating. In some embodiments, the polymer composition is a combination of polyurea and polyurethane.

The system disclosed herein may be applied in the field using existing high output spray equipment. The system meets fire properties that haven't been met in any system known to the inventors.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The invention claimed is:

1. A method of manufacturing a flame retardant polyurea elastomer coating, the method comprising:
   providing a two part polymerizable system comprising a first part containing isocyanates, and a second part containing polyamines, in which at least one of the first part and the second part contains a flame retardant, and all of spray processable graphite, a graphite suspending agent, and a graphite stabilizer agent, in which the graphite suspending agent comprises hydrogenated castor oil and Octadecanamide,N,N'-1,2-ethanediylbis 12-hydroxy-; and
   mixing the first part and the second part to form the flame retardant polyurea elastomer coating, in which the graphite stabilizer agent is selected to form a polymer char that locks the graphite together under flame heat.

2. A method of adhering a flame retardant polyurea elastomer coating to a smooth surface, the method comprising:
   providing a first part containing isocyanates, and a second part containing polyamines, in which at least one of the first part and the second part contains a flame retardant, a mineral matrix agent, and all of spray processable graphite, a graphite suspending agent, and a graphite stabilizer agent, in which the graphite suspending agent comprises hydrogenated castor oil and Octadecanamide,N,N'-1,2-ethanediylbis 12-hydroxy-;

mixing the first part and the second part to form the flame retardant polyurea elastomer coating on the smooth surface, in which the graphite stabilizer agent is selected to form a polymer char that locks the graphite together under flame heat.

3. The method of claim 2 in which the smooth surface comprises metal.

4. The method of claim 2 in which the smooth surface comprises phenolic composite panels.

5. A method of manufacturing a flame retardant polyurea elastomer coating, the method comprising:

providing a two part polymerizable system comprising a first part containing isocyanates, and a second part containing polyamines, in which at least one of the first part and the second part contains both of spray processable graphite and a graphite suspending agent, in which the graphite suspending agent comprises hydrogenated castor oil and Octadecanamide,N,N'-1,2-ethanediylbis 12-hydroxy-;

mixing the first part and the second part to form the flame retardant polyurea elastomer coating.

6. The method of claim 1 in which the graphite stabilizer agent comprises at least one of ammonium polyphosphate, zinc polyborate, melamine polyphosphate, melamine pyrophosphate, triethyl phosphate, and zinc phosphate.

7. The method of claim 2 in which the graphite stabilizer agent comprises at least one of ammonium polyphosphate, zinc polyborate, melamine polyphosphate, melamine pyrophosphate, triethyl phosphate, and zinc phosphate.

* * * * *